P. COOPER.
5943X
Making Glue.
Patented Apr. 29, 1830.
NO PRINTED COPY OF SPECIFICATION IN OFFICE.
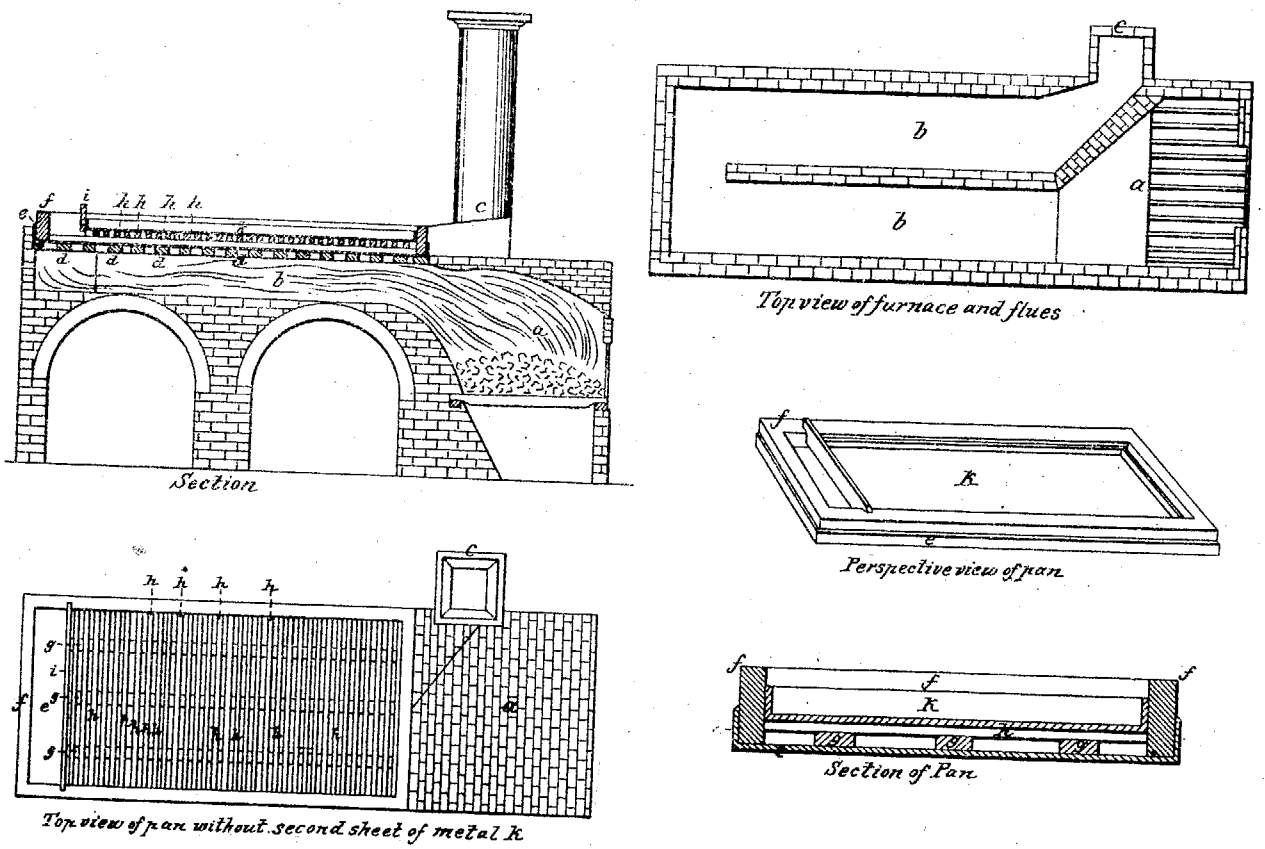

April 29, 1830 191

X5943 Peter Cooper N York City April 29, 1830

Letters Patent

The Schedule referred to in these Letters Patent and making part of the
same containing a description in the words of the said Peter Cooper himself
of his improvement in the art of making Glue by evaporating the foot water
or liquor from the boiling of bones of all kinds of animals Be it known that I Peter Cooper of New York in the County
of New York & State of New York, have invented a new and
useful improvement in the art of making Glue by evaporating the
water commonly called the foot water or the liquor after the boiling
the bones of all kinds of animals to a proper consistence for cutting
drying and making into glue by means of a double floored
evaporating basin and that the following is a full and exact descrip
tion of the construction and operation of the same as invented or impro
ved by me. This improvement consists in having an ordina
ry furnace made of brick work. from this furnace runs a horizon
tal chimney or flue half the width and running the whole length
on which it is intended to construct the evaporating basin it is
then returned on the other side back to the furnace where the flue
terminates in a perpendicular chimney, across these two flues
are to be laid at proper distances iron bars of about an inch in
breadth to support the lower basin. upon these is laid one extend
ed sheet of lead or other Metallic substance and upon the edges of
this is placed a wooden curb from six to twelve inches deep. to the out
side of this wooden curb the sheet lead is to be nailed all round &
[illegible] water tight. Upon the bottom of this basin are laid three
or 4 longitudinal strips of boards about 2 or 3 inches in width
& terminating about a foot short of the inside of the curb at the
end furthermost from the furnace. Across these and about an inch or
an inch and a half apart are slats of about an inch thick & an inch
high & nailed to the longitudinal strips on which they rest. at the

[illegible] X3943 point where the longitudinal strips terminate at the far end of the curb & about one foot from it is a piece of board going across the basin & secured to the inside of the wooden curb aforesaid. This board is to be constructed about half an inch higher than the surrounding curb and about two inches less in depth. — Upon these slats is another sheet of lead extended, or other metallic substance the edges of which is to be bent up and nailed to the inside of the curb and the board aforesaid & so as to be impervious to the water. This completes the construction of the evaporating basin water is now to be poured in the open end of the lower basin, which is beyond the board aforesaid until it fills up all the space that is between the two basins. Fire is then put to the furnace until the water boils & then the foot water or liquor remaining after boiling the oil from the bones & feet is to be run into the upper basin and the fire kept up until the foot water is evaporated to a proper consistence to be taken out and put into cooling troughs where it afterwards is cut & spread on nets to dry — This completes the process. —

The improvement for which your Petitioner claims an exclusive right is the construction of the double floored evaporating basin & the application of it to the purposes of making Glue described as aforesaid whereby the foot water or liquor after boiling the bones of all kinds of animals is evaporated into a proper consistence to preserve it and make it into Glue.

Witnesses

J. Morton
[illegible] [illegible]

Peter Cooper.

[illegible]